United States Patent [19]
Engelhard

[11] Patent Number: 5,997,097
[45] Date of Patent: Dec. 7, 1999

[54] RESTRAINING DEVICE

[76] Inventor: Joerg Engelhard, Engelbertstrasse 16-26, 50674 Cologne, Germany

[21] Appl. No.: 09/178,555

[22] Filed: Oct. 26, 1998

[30] Foreign Application Priority Data

Oct. 30, 1997 [DE] Germany .................. 297 19 307 U

[51] Int. Cl.$^6$ .................................................. A47C 31/00
[52] U.S. Cl. ........................ 297/472; 297/470; 297/471
[58] Field of Search .................... 297/472, 471, 297/470; 280/805, 801.1; 116/203; 188/371, 376

[56] References Cited

U.S. PATENT DOCUMENTS

| | | | |
|---|---|---|---|
| 3,438,674 | 4/1969 | Radke et al. | 297/472 |
| 3,749,205 | 7/1973 | Fletcher et al. | 397/472 |
| 4,060,278 | 11/1977 | Maeyerspeer | 297/472 |
| 4,457,251 | 7/1984 | Weman et al. | 297/472 |
| 4,461,492 | 7/1984 | Miki | 297/472 |

FOREIGN PATENT DOCUMENTS

| | | | |
|---|---|---|---|
| 1531512 | 7/1970 | Germany | 297/472 |
| 2141668 | 3/1973 | Germany | 297/472 |
| 7500059 | 1/1975 | Germany . | |
| 3900066 | 1/1989 | Germany . | |
| 3933762 | 10/1989 | Germany . | |

*Primary Examiner*—Laurie K. Cranmer
*Attorney, Agent, or Firm*—Diller, Ramik & Wight, PC

[57] ABSTRACT

A restraining device comprises a seat belt and a belt force limiter. The belt force limiter is arranged at a location along the belt and comprises an absorption member which is deformed or destroyed when a predetermined belt tension force is exceeded, whereby a prolongation of the belt section is caused. Further, a holding means is provided that limits the prolongation of said belt section when said absorption means is deformed or destroyed.

6 Claims, 2 Drawing Sheets

RESTRAINING DEVICE

BACKGROUND OF THE INVENTION

The present invention refers to a restraining device comprising a seat belt and a belt force limiter.

In particular in automotive vehicles and aircraft, restraining devices serve to secure the passengers in case of a vehicle crash. In a heavy collision, the tensioning forces of the belt may become strong enough for the belt to cause injuries to the secured passengers. To avoid such injuries, belt force limiters are used that momentarily relax the belt when belt tension force peaks occur, so as to alleviate the tension force peaks. Such belt force limiters are arranged at one belt end and release the belt end when a predetermined belt tension force is exceeded. Thus, the belt force limiter is arranged remote from the belt portion on which the belt force acts on the passenger and at which this force is to be limited. Thereby, the belt force limitation takes effect in the belt portions at a person's body in a reduced manner and only with a delay. Further, belt force limiters are in most cases integrated in a belt winding mechanism, which is technically rather complicated. From German Patent 39 00 066, a belt force limiter is known that has an elastic absorption member. The elastic absorption member responses proportional to the occurring tension forces, which is why it is not suited for exclusively absorbing tension force peaks. From German Patent 39 33 762, a belt force limiter is known in which the absorption member is deformed plastically. Again, the absorption member yields almost proportional to the tension force present so that in case of a delayed occurrence of tension force peaks, the absorption capacity may already be used up. German patent 75 00 059 discloses an absorption member arranged along a belt and bridging a belt loop. Since the belt loop is relatively large, the belt has a large lengthwise yield when the absorption member is destroyed so that a second tension force peak builds up.

SUMMARY OF THE INVENTION

It is an object of the present invention to provide a restraining device with improved belt force limitation.

In the present restraining device, the belt force limiter is disposed at a location along the stretch of the belt. The belt force limiter comprises an absorption member that is destroyed upon the occurrence of a predetermined tension force acting on the belt, whereby a prolongation of a belt portion is effected. Further, a separate holding means is provided that restricts the prolongation of the belt portion to a necessary minimum, when the absorption member is destroyed.

Basically, the belt force limiter may be arranged at any location along the belt. Thus, it becomes possible to provide the belt force limiter exactly at the place where the belt force is to be limited, i.e., where the belt passes along a passenger's body. The absorption member consumes a part of the tension force acting on the belt by being destroyed, with the belt being prolonged and relaxed. The holding means makes sure to restrict the relaxing prolongation of the belt to a predetermined amount. The absorption member thus allows the belt to be relaxed by prolongation which is compensated for, and thereby terminated, by the holding means. Thus, using rather simple means, a reliable belt force limiter is provided that may be arranged exactly where the belt force has to be limited to a maximum in order to avoid a passenger's body from being hurt by the belt.

In a preferred embodiment of the present invention, the absorption member holds together two belt sections and has a rated breaking point breaking upon exceeding the predetermined belt tension force so that the two belt sections are held together only by the holding means once the absorption member is broken.

Preferably, the absorption member is about X-shaped, the belt sections being fastened at opposite sides thereof and the waist of the absorption member forming the rated breaking point. The holding means may be an indestructible holding frame interconnecting both belt sections. The absorption member and the holding means together form a functional unit. When the absorption member breaks, the holding means restricts the prolongation of the belt section to a predetermined path. The length of this path is a few millimeters.

In a preferred embodiment, the belt force limiter may hold a belt section only at one side, while being fastened to the vehicle on the other side. Thus, the belt force limiter can, for example, be integrated in a belt blocking means.

Preferably, the belt force limiter comprises a brake means that delays the movement of the destroyed absorption member relative to the holding means. After the absorption member has broken, the two torn apart parts move apart being slowed down by the brake means so that the two parts are not accelerated. Thereby, an abrupt jolt caused by a braking of the belt sections under the effect of the holding means is avoided.

Preferably, the holding frame is made of metal and the absorption member is made of plastics. Whereas the plastics absorption member has a rated breaking point adapted to the requirements, the strength of the metal frame is well suited to limit the path of the belt sections reliably and exactly.

DETAILED DESCRIPTION OF THE DRAWINGS

The following is a detailed description of an embodiment of the present invention with reference to the drawings.

Figure 1:
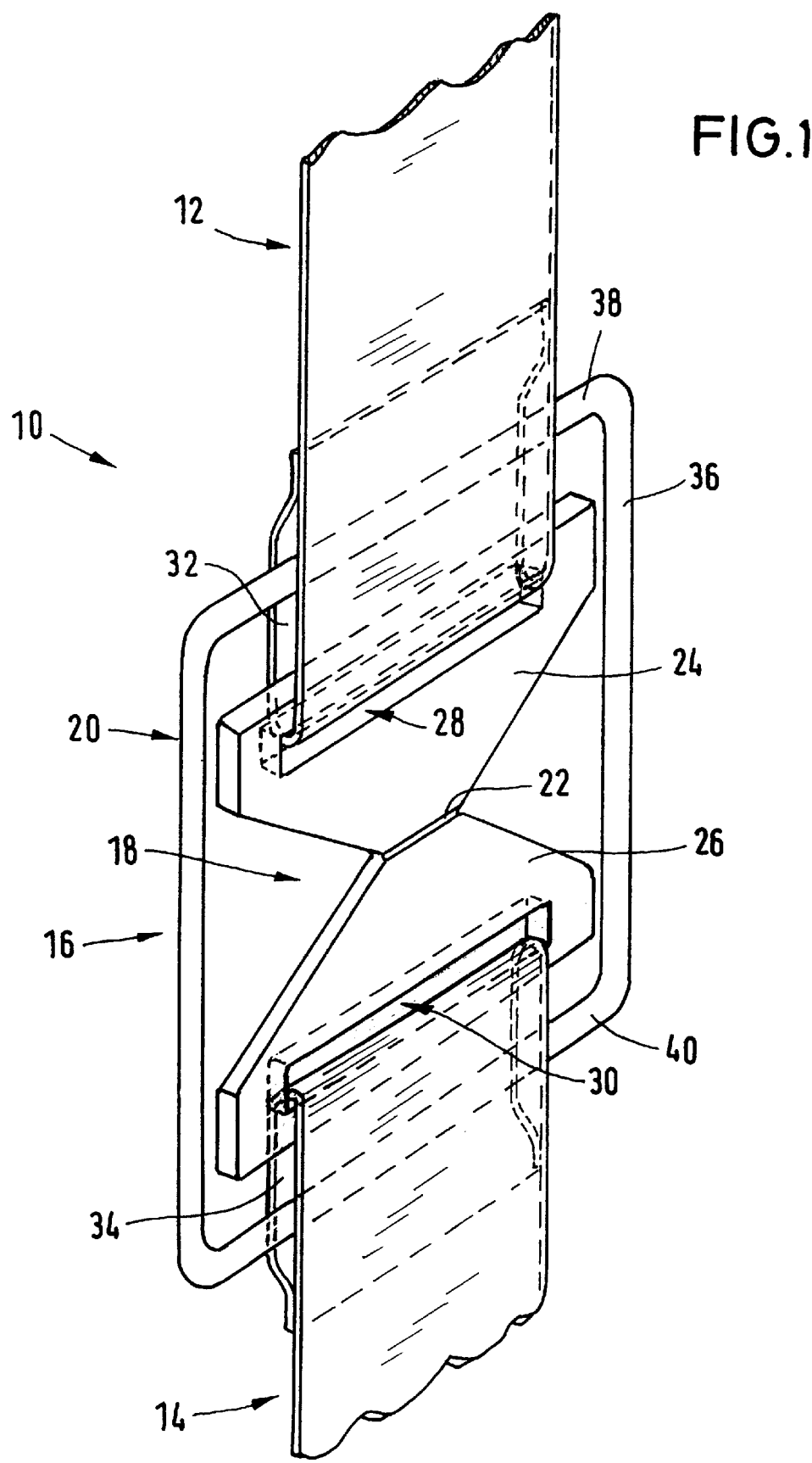
Figure 2:
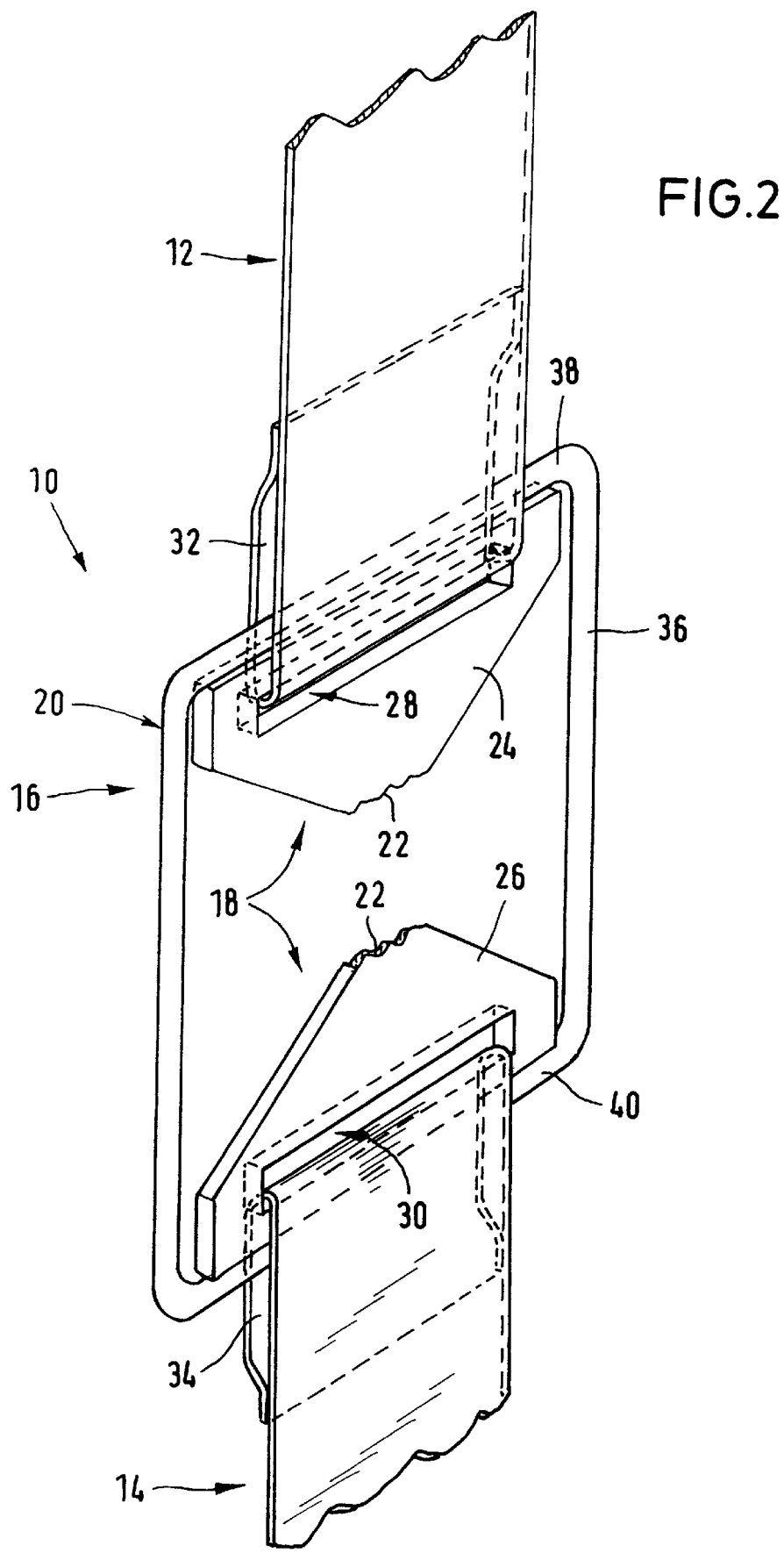

In the Figures:

FIG. 1 shows a seat belt with a belt force limiter comprising an absorption member and a holding means, and FIG. 2 illustrates the belt force limiter of FIG. 1 after a predetermined belt tension force has been exceeded.

DESCRIPTION OF A PREFERRED EMBODIMENT OF THE PRESENT INVENTION

FIG. 1 illustrates a restraining device 10 mainly comprising a seat belt 12, 14 and a belt force limiter 16. The restraining device 10 serves to secure persons in vehicles such as in automobiles, aircraft, and the like. The represented portion of the seat belt is divided into two belt sections 12, 14 that are held together solely by the belt force limiter 16. The illustrated belt section may be, for example, the breast section of three-point seat belt.

The belt force limiter 16 comprises an absorption member 18 and a holding means 20. The absorption member 18 is an almost X-shaped plastics member, the waist of which forms a rated breaking point 22 provided with a groove. This rated breaking point 22 connects two identical, almost triangular halves 24, 26 of the absorption member 18. Each of the two absorption member halves 24, 26 has a recessed transverse slot 28, 30 through which a respective loop 32, 34 of a belt end of the belt sections 12, 14 is passed, the end being sewn to form a loop.

The holding means 20 is a closed rectangular metal holding hoop 36. Two opposite transverse bars 38, 40 of the holding hoop 36 pass through the center of the loops 32, 34 such that the two belt sections 12, 14 are held together not by the holding hoop 36, but, with the absorption member 18 not destroyed, by the absorption member 18 alone.

Upon exceeding a predetermined belt tension force, the absorption member 18 breaks into two pieces 22, 24 at the rated breaking point, as illustrated in FIG. 2. Thus, the seat belt 12, 14 is momentarily relaxed so that the belt tension force is reduced. After a few millimeters, the rapidly separating belt sections 12, 14 are slowed down and firmly held together by the holding frame 36 so that the belt 12, 14 may again carry out its restraining function.

The illustrated belt force limiter 16 has a simple structure and may be manufactured at low cost, while still being very reliable. Moreover, it can be arranged at any location along a belt, i.e. in particular at the locations where the risk of tension force peaks and, thus, the risk of injuries is highest, for example in the breast strap section.

I claim:

1. A restraining device comprising a seat belt (12, 14) and a belt force limiter (16), said belt force limiter (16) being arranged between two belt sections of said seat belt (12, 14), said belt force limiter (16) includes an absorption member (18) which is destroyed only when a predetermined belt tension force is exceeded thereby causing a prolongation of the seat belt, separate holding means (20) for limiting the prolongation of said seat belt when said absorption member (18) is destroyed, said absorption member (18) being substantially X-shaped defined by opposite broad ends and a narrow medial portion therebetween defining a rated breaking point (22), and at least one of said belt sections being fastened to an associated one of said absorption member opposite broad ends.

2. The restraining device as defined in claim 1 wherein said absorption member (18) holds together said belt sections, said rated breaking point (22) breaks when a predetermined belt tension force is exceeded, and only the holding means (20) holds the two belt sections together when said absorption member (18) is broken.

3. The restraining device as defined in claim 1 wherein said holding means (20) is high strength holding frame (36) interconnecting said belt sections.

4. The restraining device as defined in claim 3 wherein said absorption member (18) is arranged within said holding frame (36).

5. The restraining device as defined in claim 4 wherein each belt section includes a belt loop (32, 34) each connected with said absorption member (18) and said holding frame (36).

6. The restraining device as defined in claim 4 wherein said holding means (20) is made of steel and said absorption member (18) is made of plastics material.

* * * * *